United States Patent Office

3,712,944
Patented Jan. 23, 1973

3,712,944
STEMLON AND ITS PRODUCTION
Martin Cole, Dorking, Surrey, and Donald N. Planterose, Guildford, Surrey, England, assignors to Beecham Group Limited, Brentford, Middlesex, England
No Drawing. Filed Jan. 2, 1969, Ser. No. 788,618
Claims priority, application Great Britain, Jan. 6, 1968, 968/68
Int. Cl. A61k 21/00
U.S. Cl. 424—115                    2 Claims

ABSTRACT OF THE DISCLOSURE

Stemlon, a substance which inhibits encephalomyocarditis virus, Semlike forest virus and coxsackie virus in mice and its production from *Stemphylium botryosum*. ATCC No. 20183 is described.

---

This invention relates to a new substance, designated "stemlon" which inhibits encephalomyocarditis virus, Semlike forest virus and coxsackie virus in mice and to a method for its production.

The invention also provides a process for preparing stemlon, which process comprises aerobically cultivating a stemlon-producing strain of *Stemphylium botryosum*, especially strain BRL 892 (IMI 130 782; ATCC 20183), in a nutrient medium containing sources of carbon, nitrogen and essential nutrients until appreciable antiviral activity is exhibited by the medium or extracts of the fungal cells, and then recovering the stemlon therefrom.

The antiviral activity can be detected by tests involving treatment of mice infected with encephalomyocarditis virus, the cumulative number of mouse deaths of treated animals compared with controls being determined.

*Stemphylium botryosum* BRL 892 was isolated from decayed tomato fruit, and was identified by the usual techniques and was found to be a novel strain.

The *Stemphylium botryosum* culture is grown on a suitable solid medium for the production of inoculum for a fermentation stage, e.g. a medium based on a mixture of carbon and nitrogen sources, mineral salts and solidified with agar. After inoculation the agar culture is allowed to grow at 26° C. for about one week. A longer growth period is usually undesirable because the culture deteriorates with time, the number of viable cells declining. A suitable medium for the production of inoculum has the following composition:

Glycerol/molasses agar

| | | |
|---|---|---|
| Glycerol | percent w./v | 0.75 |
| Molasses (Fowler's treacle) | do | 0.25 |
| Yeast extract (Difco) | percent | 0.1 |
| Peptone (Oxoid mycological) | do | 0.5 |
| $MgSO_4 7H_2O$ | do | 0.005 |
| $KH_2PO_4$ | do | 0.006 |
| NaCl | do | 2.0 |
| $FeSO_4 7H_2O$ | do | 0.0003 |
| $CuSO_4 5H_2O$ | do | 0.0001 |
| Agar (Oxoid ionagar) | do | 2.0 |

The agar medium, sterilized by autoclaving in the usual way, is dispensed into test tubes or medical flats, plugged with cotton wool, and allowed to set to form a slope. For longer term storage, the culture is grown on the above agar medium in test tubes for about a week before covering the entire slope culture with autoclaved liquid paraffin B.P. Under these conditions the culture may be stored at room temperature for several years without loss of viability.

The fermentation stage involves culturing the Stemphylium culture in a suitable nutrient medium under aerobic conditions at a temperature in the range of 20–30° C. A suitable nutrient medium is one consisting of a source of organic or inorganic nitrogen and a source of carbohydrate and mineral salts. A particularly suitable medium consists of 2% malt distillers' dried solubles and 1% sucrose in deionized water. This medium has a final pH of 6.5. This medium is dispensed in 100 ml. volume portions into 500 ml. conical flasks, closed with a cotton-wool plug and sterilized by autoclaving at 121° C. for 15 minutes. The medium may also be steam sterilized in stainless steel fermenters, and the fungus grown therein.

The fermentation stage is inoculated by using a suspension of fungal cells prepared by scraping the surface of an agar slope-culture, described above, in the presence of added deionized water. Typically 10 ml. of sterile water is added to an agar culture in a test tube or 50 ml. to an agar culture in a 10 oz. medical flat. The fermentation medium is inoculated with between 1 and 5% of the inoculum suspension of fungal cells. Preferably 3% is used for inoculating conical flasks, that is 3 ml. of cell suspension is added to each 100 ml. of culture medium in a conical flask.

The fungus is cultivated in the fermentation stage for 2–14 days at a temperature in the range of 20–35° C. Preferably the cultivation is carried out for 4–10 days at 26° C. Cultures in conical flasks are shaken on a rotary shaker or incubated static; cultures in fermenters are incubated by passing sterile air through the culture medium. Cultivation may be carried out in a continuous manner in a suitable vessel by continuously feeding fresh culture medium at the same rate as removing grown culture.

The stemlon is found both in the filtrate obtained after removing the fungal cells from the culture medium by filtration through cotton wool and gauze or by slow speed centrifugation, and in the cell-free fluid obtained after disrupting living or killed fungal cells by physical methods. Suitable physical methods are ultrasonic treatment, high speed stirring, blending, homogenization, rolling or grinding with abrasive material. After this treatment, cell debris is removed by slow speed centrifugation and the supernatant contains the stemlon. Some of the stemlon may be sedimented by ultra-centrifugation of cell fluid or culture filtrate.

The stemlon is detected by demonstrating increased numbers of survivors or increase in survival time of mice infected with 1–1000 mouse $L.D._{50}$'s of encephalomyocarditis virus. The route of administration of the stemlon may be intraperitoneal, intravenous, or subcutaneous, but the intraperitoneal route is preferable.

Against encephalomyocarditis virus, stemlon is active if given at the time of virus infection or up to 2 days prior to infection. With Stemliki forest virus, stemlon is active if given 1 day before virus infection. Stemlon is more active prophylactically than therapeutically.

Stemlon is not active against encephalomyocarditis virus in a tissue culture line of baby hamster kidney cells (BHK 21) or mouse L-cells.

In mice, stemlon does not stimulate the production of antibody to sheep red cells nor does it act as an adjuvant, nor does it act as an immunosuppressant. Stemlon is still prophylactic in mice that have previously had repeated doses of stemlon.

Centrifugation, chromatography on Sephadex, Amicon membrane filtration and dialysis show the stemlon to have molecular weight greater than 10,000. Some of the activity of stemlon is sedimentable at 100,000 g. for 1 hour. Stemlon may be concentrated by rotary evaporation under vacuum and may be stored at −20° C. Acetone can be used to precipitate stemlon from culture filtrates of *Stemphylium botryosum*. Crude preparations of stemlon are resistant to treatment with n-butanol. Such preparations are unstable at below pH 5 and are most stable in the region 6.5–8.0.

The invention also provides a composition comprising stemlon together with a pharmaceutically acceptable carrier. The carrier may be sterile water for parenteral use, or solid binders, diluents etc. for oral use.

The following examples illustrate the invention:

EXAMPLE 1

*Stemphylium botryosum* BRL. 892 was grown for seven days on a glycerol/molasses agar slope in a test tube. The culture was scraped in the presence of 10 ml. of added sterile water to give a suspension of fungal cells. The 3 ml. portions of this suspension were each used to inoculate the 100 ml. of fermentation medium contained in a 500 ml. conical flask, closed with a cotton wool plug. The fermentation medium, final pH 6.5, consisted of 2% "Scotasol" and 1% sucrose made up in deionized water. The medium was sterilized by autoclaving for 15 minutes at 121° C. The inoculated fermentation flasks were shaken for 5 days at 26° C., on a rotary shaker with a 1″ throw, by which time a good growth of the fungus was obtained.

The whole culture was centrifuged at 3000 g. for 10 minutes, the supernatant was adjusted to pH 7 with 5 N HCl and re-centrifuged at 28,000 g. for 30 minutes. The filtrate was passed through an Oxoid membrane filter to render it bacteriologically sterile, dispensed into glass bottles in 12 ml. volumes and frozen until required for the anti-viral test. The activity of this filtrate was demonstrated by showing that administration to mice delayed their time of death and increased their chances of surviving the effects of an otherwise lethal dose of encephalomyocarditis virus. The results of such a test are shown in the following Table 1.

TABLE 1

Animal: Mice, strain TO, male 18–22 g.
Virus: Encephalomyocarditis virus, 0.1 ml. containing 100 mouse $I.D._{50}$'s given intraperitoneally on day 0.
Stemlon: Culture filtrate.
Dose of Stemlon: 0.2 ml. on day before infection, 0.2 ml. on day of infection, 0.2 ml. given twice a day on days, one, two, and three after infection. Route: subcutaneous.

Cumulative Number of Deaths

| Group | Day after infection | | | | | | Total number of deaths/ total number in group |
|---|---|---|---|---|---|---|---|
| | 4th | 5th | 6th | 7th | 8th | 14th | |
| Treated | 0 | 1 | 2 | 2 | 7 | 7 | 7/15 |
| Control | 4 | 9 | 12 | 12 | 14 | 14 | 14/15 |
| Statistical significance "P" | <0.05 | 0.003 | <0.005 | 0<.005 | 0.007 | 0.007 | 0.007 |

EXAMPLE 2

In this example the *Stemphylium botryosum* strain BRL. 892 was cultivated for 4 days in shaken flasks in exactly the same way as described in Example 1. A volume of 1.4 l. of 4 day culture was filtered through cotton/wool gauze pads and the fungal cells (mycelium) suspended in 400 ml. of pH 7.6 0.05 M borate buffer containing 0.1% thioglycollate as antioxidant. This mycelial suspension was smashed in a MSE atomix blender for 3 minutes before treatment with ultrasonics (MSE 100 watt instrument) for 30 minutes to disrupt the fungal cells. The resulting suspension was centrifuged at 4000 g. for 10 minutes to remove cell debris before ultracentrifugation of the supernatant at 133,000 g. for one hour (Spinco $L_{50}$ head). The resulting pellet of particulate material, after rejection of the supernatant, was re-suspended in 50 ml. of 0.04 M phosphate buffer (pH 7) by sonication. The activity of the substance in this particle suspension was revealed by a delay in the time of death and fewer deaths when it was administered to mice before and after infection with an otherwise lethal dose of encephalomyocarditis virus, as shown in Table 2.

TABLE 2

Animal: Mice, strain TO, male 18–22 g.
Virus: Encephalomyocarditis virus 0.1 ml. containing 10 mouse $ID_{50}$'s given intraperitoneally on day 0.
Stemlon: Suspension of material obtained after the sedimentation of mycelium cell contents at 133,000 g. for 1 hour and re-suspension in phosphate buffer.
Dose of Stemlon: 0.5 ml. one day before infection, 0.5 ml. given on day of infection, 0.2 ml. given twice a day on days one, two and three after infection. Route: Intraperitoneal.

Cumulative Number of Deaths

| Group | Day after infection | | | | | | | | | Total number of deaths/total number in group |
|---|---|---|---|---|---|---|---|---|---|---|
| | 5th | 6th | 7th | 8th | 9th | 10th | 11th | 12th | 13th | |
| Treated | 0 | 4 | 4 | 4 | 4 | 5 | 6 | 6 | 6 | 6/15 |
| Control | 3 | 5 | 9 | 10 | 12 | 12 | 12 | 12 | 15 | 15/5 |
| Statistical significance "P" | | | | 0.033 | <0.005 | 0.013 | 0.030 | 0.030 | <0.003 | <0.003 |

EXAMPLE 3

A suspension of spores of *Stemphylium botryosum* BRL 892 was prepared from a glycerol/molasses agar culture in a Roux bottle and used to inoculate 75 l. of liquid medium of the following composition: 2% Scot-

TABLE 3

Animal: Mice, strain ICI, male 18–22 g.
Virus: Encephalomyocarditis virus, 0.1 ml. containing 10 mouse $LD_{50}$'s given intraperitoneally on day 0.
Antiviral material: Culture filtrates taken from the 150 l. fermentation at 89, 113, 137, and 158 hours.
Dose of antiviral material: 0.5 ml. given intraperitoneally on the day before infection.

Cumulative Numbers of Deaths

| Culture filtrate sample | Day after infection | | | | | | | Total number of deaths/ total number in group (at day 14) |
|---|---|---|---|---|---|---|---|---|
| | 4th | 5th | 6th | 7th | 8th | 9th | 10th | |
| 89 hr | 0 | 0 (<0.05) | 2 (<0.017) | 5 | 8 | 8 | 8 | 8/15 |
| 113 hr | 0 | 3 | 4 | 5 | 6 | 7 | 7 | 7/15 |
| 137 hr | 0 | 1 | 2 (<0.017) | 2 (<0.005) | 4 (0.007) | 5 (0.012) | 6 (0.033) | 6/15 (0.33) |
| 158 hr. (Harvest) | 0 | 0 (<0.05) | 0 (<0.005) | 0 (<0.005) | 0 (<0.005) | 0 (<0.005) | 0 (<0.005) | 2/15 (<0.05) |
| Control | 3 | 7 | 15 | 19 | 21 | 22 | 22 | 22/30 |

NOTE.—Statistical significance "P" in brackets.

asol, 1% sucrose, 20 ml. antifoam consisting of 10% Pluronic L81 in white mineral oil. This medium, at pH 6.5, was sterilized at 121° C. for 30 minutes in a 100 l. baffled stainless steel fermenter. This seed stage fermenter was stirred and aerated for 76 hours at 26° C.

Then 7.5 l. of this culture was used to inoculate 150 l. of medium having the same composition as the seed stage medium. This medium was sterilized at 121° C. for 30 minutes in a 300 l. fully baffled stainless steel fermenter. This fermenter was stirred at 240 r.p.m. by a vaned disc impeller (8½" dia.) and aerated with sterile air at the rate of 75 l./min. The temperature was controlled at 26° C. The fermentation was run for 158 hours by which time the pH had risen from 6.3 to 8.0. A dry weight yield of mycelium of 8.6 mg./ml. was obtained at 96 hours, but fell to 5.0 mg./ml. at 158 hours. At 158 hours the mycelium was removed by cloth filtration and the culture filtrate used as a source of stemlon. The activity of this preparation of stemlon is shown in Table 3 along with the activity of samples of culture filtrate obtained during fermentation.

We claim:
1. A process for preparing the substance stemlon, which comprises aerobically cultivating *Stemphylium botryosum*, ATCC No. 20183, at a temperature of 20–35° C. for 2 to 14 days in a nutrient medium and recovering the stemlon produced.
2. Stemlon produced according to the process of claim 1.

No references cited.

JEROME D. GOLDBERG, Primary Examiner

U.S. Cl. X.R.

195—81